United States Patent
Roenpagel et al.

(10) Patent No.: US 9,211,427 B2
(45) Date of Patent: Dec. 15, 2015

(54) METHOD FOR COATING PIPES

(71) Applicant: Minimax GmbH & Co. KG, Bad Oldesloe (DE)

(72) Inventors: Andreas Roenpagel, Ahrensburg (DE); Michael Steinhoff, Herdecke (DE)

(73) Assignee: Minimax GmbH & Co. KG, Bad Oldesloe (DE)

( * ) Notice: Subject to any disclaimer, the term of this patent is extended or adjusted under 35 U.S.C. 154(b) by 0 days.

(21) Appl. No.: 14/376,323

(22) PCT Filed: Dec. 7, 2012

(86) PCT No.: PCT/EP2012/074769
§ 371 (c)(1),
(2) Date: Aug. 1, 2014

(87) PCT Pub. No.: WO2013/113434
PCT Pub. Date: Aug. 8, 2013

(65) Prior Publication Data
US 2015/0075668 A1    Mar. 19, 2015

(30) Foreign Application Priority Data
Feb. 5, 2012 (EP) ..................... 12153964

(51) Int. Cl.
*F16L 58/10* (2006.01)
*B05D 7/22* (2006.01)
*A62C 35/68* (2006.01)

(52) U.S. Cl.
CPC . *A62C 35/68* (2013.01); *B05D 7/22* (2013.01); *F16L 58/1009* (2013.01); *F16L 58/1054* (2013.01)

(58) Field of Classification Search
None
See application file for complete search history.

(56) References Cited

U.S. PATENT DOCUMENTS

| | | | |
|---|---|---|---|
| 2,326,844 A * | 8/1943 | Ely | 427/234 |
| 2,718,474 A | 9/1955 | Hodil et al. | |
| 3,701,336 A | 10/1972 | McConnell et al. | |
| 4,398,346 A * | 8/1983 | Underhill et al. | 29/623.5 |
| 7,819,140 B2 | 10/2010 | Bass et al. | |
| 2009/0098296 A1 | 4/2009 | Finne et al. | |
| 2009/0194187 A1 | 8/2009 | Laumann et al. | |
| 2010/0189909 A1* | 7/2010 | Dixon et al. | 427/430.1 |

FOREIGN PATENT DOCUMENTS

| | | |
|---|---|---|
| CN | 1736617 A | 2/2006 |
| CN | 2928269 Y | 8/2007 |
| CN | 201779403 U | 3/2011 |
| JP | H06193792 A | 7/1994 |
| JP | 2010000264 A | 1/2010 |
| WO | WO 00/48806 A1 * | 8/2000 |

OTHER PUBLICATIONS

Canadian Intellectual Property Office communication concerning CA 2,863,535 A; Oct. 7, 2015; 3 pages.*

* cited by examiner

*Primary Examiner* — William Philip Fletcher, III
(74) *Attorney, Agent, or Firm* — Harness, Dickey & Pierce, P.L.C.

(57) ABSTRACT

A method for coating a pipe (1) in the interior thereof, wherein the method has at least the following method steps: (i.) providing an immersion basin (2) which is filled with a coating liquid (3); (ii.) first immersion of the pipe (1) to be coated into the coating liquid (3); (iii.) first removal of the pipe (1) to be coated from the coating liquid (3) ensuring an angle ($\alpha$) between the central axis (M) and the surface of the coating liquid (3) with $1°<(\alpha)<30°$; (iv.) second immersion of the pipe (1) to be coated into the coating liquid (3); (v.) second removal of the pipe (1) to be coated from the coating liquid (3) ensuring an angle ($\beta$) between the central axis (M) and the surface of the coating liquid (3) where $-30°<(\beta)<-1°$.

16 Claims, 2 Drawing Sheets

METHOD FOR COATING PIPES

CROSS-REFERENCE TO RELATED APPLICATIONS

Figure 1:
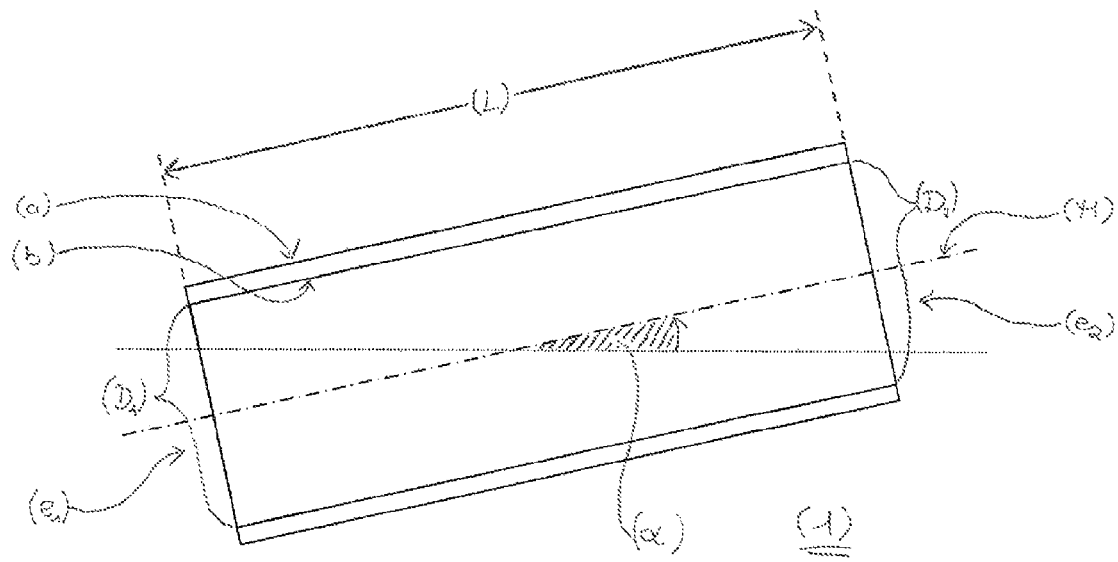

This application is a National Stage of International Application No. PCT/EP2012/074769, filed Dec. 7, 2012, which claims priority to European Application No. 12153964.7, filed Feb. 5, 2012. The entire disclosures of each of the above applications are incorporated herein by reference.

FIELD

The present disclosure concerns a method of coating a pipe (1) in its interior, wherein the pipe (1) to be coated in its interior has an outside (a) and an inside (b), a first outer end ($e_1$) at the first end of the pipe (1) and a second outer end ($e_2$) at the second end of the pipe (1), a length (L), a first inside diameter ($D_1$) at the first end of the pipe (1) and a second inside diameter ($D_2$) at the second end of the pipe (1), and a central axis (M). The disclosure preferably concerns a method of simultaneously coating a plurality of pipes (1) which respectively comply with the features of the above enumeration.

The disclosure also concerns pipes (1) which are produced in accordance with the method proposed here and also the use of such pipes (1) as transport pipes for fire extinguishing media within a fire extinguishing system.

BACKGROUND AND SUMMARY

The inventors initially found themselves confronted with the specific task of monetary improvement in the design and operation of fire protection installations, more precisely sprinkler installations. In general terms the task which arose was such that no pipe material in particular of mild steel and for use as transport means for fire extinguishing media was available on the market, which was free from corrosion even after a prolonged period of use and which could therefore be made the subject of warranty claims.

After intensive consideration and tests the inventors were finally able to find a method, by means of which it is possible to produce pipes which completely satisfy those demands. The method according to the disclosure in its most general form is to be described in such a way that a method of coating a pipe (1) in its interior is claimed, wherein the pipe (1) to be coated in its interior has an outside (a) and an inside (b), a first outer end ($e_1$) at the first end of the pipe (1) and a second outer end ($e_2$) at the second end of the pipe (1), a length (L), a first inside diameter ($D_1$) at the first outer end of the pipe (1) and a second inside diameter ($D_2$) at the second outer end of the pipe (1), and a central axis (M), wherein the method according to the disclosure is characterised in that the method has at least the following method steps: (i.) providing an immersion basin (2) which is filled with a coating liquid (3) up to a filling level (h) and is suitable for receiving over its full length (L) the pipe (1) to be coated; (ii.) first immersion of the pipe (1) to be coated into the coating liquid (3); (iii.) first removal of the pipe (1) to be coated from the coating liquid (3) ensuring an angle ($\alpha$) between the central axis (M) and the surface of the coating liquid (3) with $1°<(\alpha)<30°$; (iv.) second immersion of the pipe (1) to be coated into the coating liquid (3); (v.) second removal of the pipe (1) to be coated from the coating liquid (3) ensuring an angle ($\beta$) between the central axis (M) and the surface of the coating liquid (3) with $-30°<(\beta)<-1°$; and (vi.) ensuring a filling level (h) of the coating liquid (3) in the immersion basin (2) with $(h)>(L)\cdot\sin(\alpha)$ and $(h)>(L)\cdot\sin(\beta)$.

For economic reasons it is deemed preferable if a plurality of pipes (1) implement method steps (ii.) to (vi.) simultaneously, that is to say, not just an individual pipe (1) but at the same time a plurality of pipes (1) perform the two dipping operations in the coating liquid (3), wherein the filling level (h) of the coating liquid (3) in the immersion basin (2) is so selected that at the lowest point of the pipes (1) during the dipping operations all pipes (1) are entirely immersed in the coating liquid (3).

In a preferred embodiment of the method proposed here the four method steps (ii.) of first immersion, (iii.) of first removal, (iv.) of second immersion and (v.) of second removal are repeated with a repetition frequency of between 1 and 7, quite particularly preferably with a repetition frequency of between 1 and 3. In the particularly preferred case this means that the pipes (1) perform the four method steps (ii.) of first immersion, (iii.) of first removal, (iv.) of second immersion and (v.) of second removal up to three times in succession.

In a further preferred embodiment of the method proposed here the angle ($\alpha$) is within the range of 1.8° and 5.5° and still further limitedly within the range of 1.8° and 3.5°. At the same time it is deemed to be preferable if the angle ($\beta$) is within the range of −1.8° and −5.5°, still further limitedly within the range of −1.8° and −3.5°. Quite particularly preferably the angles ($\alpha$) and ($\beta$) are identical within the four method steps (ii.) of first immersion, (iii.) of first removal, (iv.) of second immersion and (v.) of second removal.

In general and preferably in accordance with the disclosure the coating liquid (3) is in the form of an aqueous dispersion. The inventors recognized in that respect that, during the coating operation, diffusion of the particles intended for the coating in the form of at least a solid constituent of the dispersion takes place very slowly in respect of time in the direction of the pipe inside wall to be coated. The inventors further realized that, to ensure an adequate coating thickness in a preferred range of 15 to 28 µm, quite particularly preferably in a range of 21 to 27 µm, a preferably turbulent flow in relation to the inside pipe walls (b) with the coating liquid (3) is to be produced. In that respect the preferably turbulent flow has to perform the task of bringing coating particles into contact with the inside walls (b) of the pipes (1) to be coated, as continuously and constantly as possible. For that purpose therefore it is necessary to ensure not only a preferably turbulent flow but also coating liquid (3) which is to be sufficiently taken past the pipe inside wall to be coated. The sufficient amount of coating liquid (3) is ensured: firstly by the filling level (h) of the coating liquid (3) in the immersion basin (2) in accordance with method step (vi.) according to the disclosure, and secondly by the two dipping operations in accordance with method steps (ii.) to (v.) according to the disclosure, in which on the one hand the first outer end ($e_1$) at the first end of the pipe (1) and on the other hand the second outer end ($e_2$) at the second end of the pipe (1) are respectively at a deeper position during the two dipping operations in accordance with method steps (ii.) to (v.) according to the disclosure and by virtue of the pipe (1) which is filled with coating liquid (3) this ensures that a large amount of coating liquid (3) can be taken past the deeper pipe regions.

After intensive underlying work on the disclosure the inventors finally realized that a range of 1° to 30° is essential to the disclosure for the angle ($\alpha$) and a range of −1° to −30° is essential to the disclosure for the angle ($\beta$). The significance of this feature is that the pipe (1) to be coated is pivoted through the angle ($\alpha$) with $1°(-\alpha)<30°$ [and through the angle ($\beta$) with $-30°<(\beta)<-1°$ respectively] with respect to the horizontal which extends parallel to the surface of the coating liquid (3). Below 1° and above −1° there is on the one hand the risk of the pipes (1) floating up upon being immersed in the coating liquid (3) while on the other hand a sufficient and in particular turbulent flow is not formed either during immersion of the pipes (1) in the coating liquid (3) nor during removal of the pipes (1) from the coating liquid (3), whereby adequate interchange of coating liquid (3) in direct contact with the inside wall (b) of the pipes (1) is not possible, due to the flow thereat. That leads to a non-uniform and in particular excessively thin coating with flaws. Above 30° and below −30° the times in which—during immersion of the pipes (1) in the coating liquid (3) and during removal of the pipes (1) from the coating liquid (3)—the coating liquid (3) comes into contact with the inside walls (b) of the pipes (1) is too short to guarantee an adequate and sufficiently thick coating on the pipe inside walls. With the preferred angle ranges it was possible to further significantly improve the coating thicknesses and qualities.

In principle many different coatings when applying the method proposed here are conceivable like for example anodic and also cathodic dip-paint coating and Parkerising. After many intensive considerations and tests linked to such considerations a quite particularly preferred embodiment of the present disclosure is implemented if within the method proposed here in all its various embodiments the coating liquid (3) is an epoxy/acrylic-based Aquence™ coating material, wherein in particular the Aquence™ method of the 900 series and likewise possible subsequent series involving similar technology is deemed to be quite particularly preferred.

The Aquence™ method developed by Henkel of Düsseldorf, Germany, is capable of producing a chemical-based coating here at the inside wall (b) of pipes (1), in which in a fundamental fashion and with a view of the disclosure presented here $FeF_3$ iron fluoride supplied in the form of a dispersion provides for a liberation of $Fe^{2+}$ ions at the inside surface of the metal pipes (1), which are combined with paint particles which are equally supplied in the form of the above dispersion and which are then again deposited at the inside surface of the metal pipes (1). In the course of a sufficiently long deposition process over the cycle of at least two dipping operations in accordance with the four method steps (ii.) of first immersion, (iii.) of first removal, (iv.) of second immersion and (v.) of second removal a coating is built up in that way of a layer thickness in the preferred range of 15 to 28 quite particularly preferably in a range of 21 to 27 μm. With the particularly preferred Aquence™ method of the 900 series an epoxy/acrylic based inwardly disposed corrosion protection coating is produced in the above-described manner.

Not least with a view to the last two sentences of the previous paragraph however it is also generally deemed to be preferred, as a preferred embodiment of the method proposed here, if the immersion speed ($v_1$) for the first immersion, the speed ($v_2$) for the first removal, the immersion speed ($v_3$) for the second immersion, and the speed ($v_4$) for the second removal are respectively in a range of 6 to 12 m/min. At the same time the filling level (h) to ensure internal wetting over its entire periphery with the coating liquid (3) over the entire pipe length (L) of the pipe (1) to be coated during an entire immersion and removal cycle in accordance with method steps (ii.) together with (iii.) and (iv.) together with (v.) having regard to the speeds ($v_1$, $v_2$, $v_3$, $v_4$) is so selected that the wetting time of the pipe inside wall (b) with the coating liquid (3) is over a period of 60 sec to 210 sec, quite particularly preferably over a period of 85 sec to 105 sec.

To promote the flow which is preferably turbulent in the method proposed here in the pipes (1) during the coating operation the coating liquid (3) is kept in motion in the immersion basin (2) by means of a circulating device (6). Such a circulating device (6) is preferably a propeller involving a slow rotary speed.

The method proposed here is basically not limited in respect of the material and the structural form of the pipes (1) to be coated, but the method is deemed primarily and thus preferably as adapted for coating pipes (1) of mild steel which quite particularly preferably are longitudinally welded. In the case of such pipes (1) their possible length (L) with the method proposed here is firstly exclusively limited by the length of the immersion basin (2), lengths (L) of up to 12 m are preferred, further limitedly preferred between 7 and 12 m and quite particularly preferred of a length (L) in a range of 7 m to 10 m. Further preferred are such pipes (1), in particular of mild steel, in which the first inside diameter ($D_1$) at the first end of the pipe (1) and the second inside diameter ($D_2$) at the second end of the pipe (1) are identical within the limits of the possible production tolerances. In that respect those pipes (1) within a first preferred range are of a nominal width (n) of DN 32 to DN 250, which in the context of use of fire protection installations corresponds to the usual pipe nominal widths of the main conduit, for example in the form of riser conduits, by way of possible secondary distribution pipes, for example in the form of distributor conduits, as far as the sprinkler connection pipes, for example in the form of branches (branch lines). Within that first preferred range a range of DN 32 to DN 65 is deemed to be quite particularly preferred, which in the context of the use of fire protection installations corresponds to the pipe nominal widths of usual secondary distribution pipes as far as the sprinkler connection pipes. Within a second preferred range the pipes (1) even have a still smaller nominal width (n) of DN 15 to DN 32, in which case such pipes could not hitherto at last acquire a corrosion-inhibiting inside wall coating by means of any method implemented on a large technical scale.

The method steps proposed here for coating pipes (1) in their interior by immersion in the coating liquid (3), in particular in the coating liquid (3) in the form of the epoxy/acrylic-based Aquence™ coating material are preferably preceded by a multi-stage degreasing operation in particular with interposed acid etching treatment, wherein all those stated treatments are implemented by means of dip baths.

In numerous tests preceding the present disclosure it was found to be particularly positive if the respective pipe (1) to be coated is held by means of bar-like support holders at least during the four method steps (ii.) first immersion, (iii.) first removal, (iv.) second immersion and (v) second removal. Admittedly those bar-like support holders have the disadvantage of reduced friction between holder and pipe (1) to be coated at its outside (a), but in return the coating flaws to be fettled are very slight, which is clearly found to be a minor disadvantage. If, as is preferred, a plurality of pipes (1) are simultaneously subjected to method steps (ii.) to (vi.) it is deemed to be preferred if the bar-like support holders of that kind are parts of an immersion frame. The immersion frame together with the bar-like support holders then permits simultaneous coating of a plurality of pipes (1) which in that case are arranged in mutually juxtaposed and/or superposed relationship during the coating operations. It is quite particularly preferred if in that case the bar-like support holders and/or the immersion frame are Teflon-coated, which applies in particular when the coating liquid (3) is in the form of an epoxy/acrylic-based Aquence™ coating material.

The disclosure also concerns pipes (1) produced in accordance with the method proposed here, wherein such pipes (1) have an outside and an inside anti-corrosion coating. Preferably that anti-corrosion coating is an epoxy/acrylic-based Aquence™ coating. That coating is quite particularly preferably such that the coating on the pipes (1) both externally and also internally is of a layer thickness in the preferred range of 15 to 28 μm, quite particularly preferably in a range of 21 to 27 μm.

The inventors place their main focus on the use of the pipes (1), as are produced in accordance with at least one possible configuration of the method proposed here, as a transport pipe for fire extinguishing media within a fire extinguishing system. In that case pipes (1) as are produced in accordance with at least one possible embodiment of the method proposed here achieve a value for C in a range of 125 to 150 both upon first being commissioned and also within a period of use of a year and quite particularly preferably also within a period of use of five years after first being commissioned. In that respect the value C denotes the constant for the type and condition of a pipe in the Hazen-Williams formula which is formula (1), with $$P=6.05 \cdot 10^5 \cdot L \cdot Q^{1.85} \cdot C^{(-1.85)} \cdot d^{(-4.87)}$$

wherein
P=pressure drop in the pipe, in bars,
Q=through-flow rate through the pipe, in l/min,
d=mean inside diameter of the pipe, in mm,
C=constant for type and condition of the pipe, and
L=equivalent of pipe and shaped portions, in m.

Ensuring a value for C in a range of 125 to 150, on the basis of an internally disposed corrosion protecting coating of such a configuration, provides for completely even and non-porous sealing means of the insides of the pipes (1), which no longer has the extinguishing medium carried by the pipes (1) infiltrating therebeneath even over many years, which applies even for the ends of the pipes (1), that are brought together in the couplings.

The pipes (1) produced in accordance with the method proposed here are practically unlimited in respect of their nominal size, in particular and preferably the pipes (1) should involve a nominal width (n) in a range of DN 32 to DN 250, which corresponds to the usual pipe nominal widths within the fire extinguishing systems which are particularly favoured as the application thereof from the main conduit, for example in the form of riser conduits, by way of possible secondary distribution pipes, for example in the form of distributor conduits, as far as the sprinkler connection pipes, for example in the form of branches (branch conduits). In a quite particularly preferred configuration the pipes (1) should be of a nominal width in a range of DN 32 to DN 65, which corresponds to the pipe nominal widths of usual secondary distribution pipes to the sprinkler connection pipes.

DRAWINGS

Figure 2:
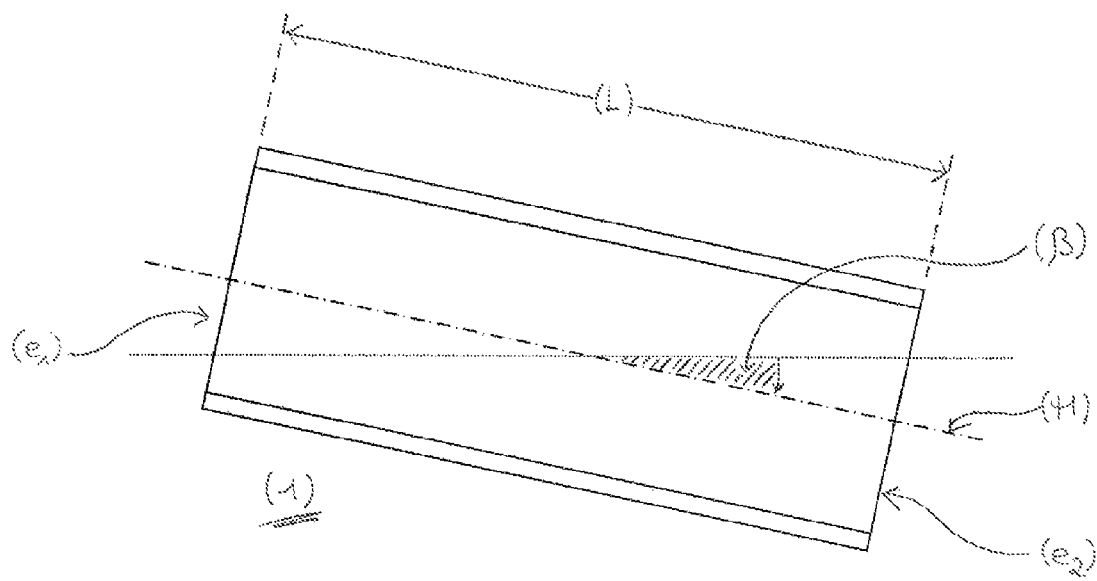
Figure 3:
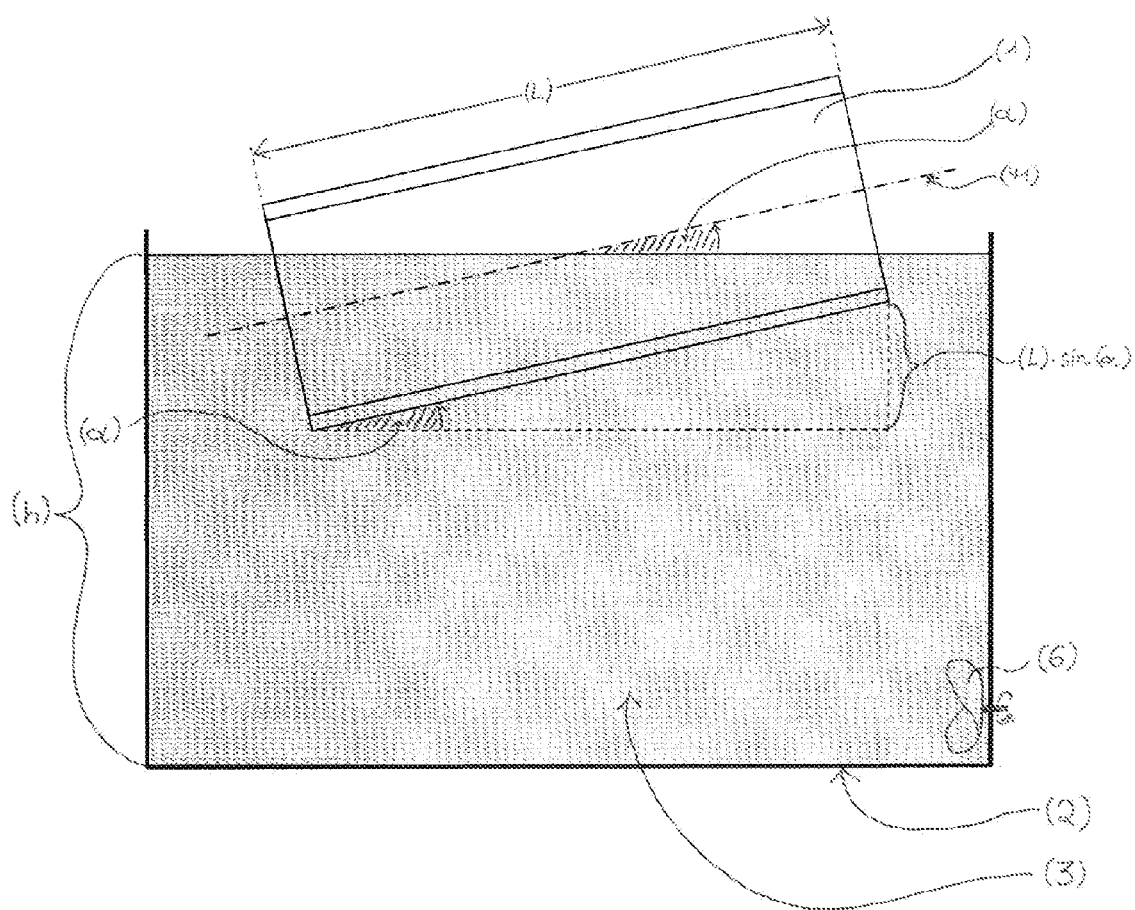

Following FIGS. 1 to 3 are intended to describe the present disclosure in greater detail.

FIG. 1 shows a pipe (1) to be coated with the method proposed here, which is pivoted through an angle (α) with 1°<(α)<30° with respect to the horizontal which extends parallel to the surface (not shown) of the coating liquid (3). The pipe (1) which is considered here as a longitudinally welded metal pipe has: an outside (a) as the outwardly disposed surface of the pipe (1), an inside (b) as the inside wall of the pipe (1), and a length (L), and at its first outer end ($e_1$) which here is placed lower, it is of a first inside diameter ($D_1$) which is identical to the second inside diameter ($D_2$) at the second end ($e_2$) of the pipe (1), that here is placed higher.

FIG. 2 shows—viewed from the same position—the same pipe (1) as was already shown in FIG. 1, with the difference that the pipe (1) is now pivoted through an angle (β) with −30°<(β)<−1° relative to the horizontal which extends parallel to the surface (not shown) of the coating liquid (3). What is decisive here is that, in contrast to the situation shown in FIG. 1, and where the one end of the pipe (1)—here the first outer end ($e_1$)—is placed at a lower position, now the other end of the pipe (1)—here the second outer end ($e_2$)—is placed at the lower position while the respective other end of the pipe is placed at the correspondingly higher position.

FIG. 3 shows a scenario during method step (iii.) in which the pipe (1) to be coated, after first immersion in the coating liquid (3) according to method step (ii.) issues again from the coating liquid (3), ensuring an angle (α) between the central axis (M) and the surface of the coating liquid (3) with 1°<(α)<30° and is removed. In that case the pipe which was already shown in greater detail in FIG. 1 is used, in which the second end ($e_2$) of the pipe (1) is higher by the amount (L)·sin(α) in comparison with the first end ($e_1$) of the pipe (1). In FIG. 3 the pipe is in part already outside the coating liquid (3) which evidently within the immersion basin (2) is of a filling level (h), with (h)>(L)·sin (α). To promote a preferably turbulent flow in the pipe (1) during the coating operation in the illustrated case a propeller for circulating the coating liquid (3) is provided at the side wall of the immersion basin (2).

DETAILED DESCRIPTION

The disclosure will be illustrated in greater detail by means of the Examples hereinafter. For that purpose longitudinally welded metal pipes which are each 9 m in length and which have a continuous nominal width (n) in a range of DN 15 and DN 32 respectively are placed on numerous Teflon-coated bar-like support holders of an immersion frame which is also Teflon-coated. The immersion frame is carried from above by means of a travelling carriage crane which is capable of individually lowering and raising both the front part and also the rear part of the immersion frame individually, wherein the respective first ends of the pipes (1), carried by the immersion frame with the support holders, and the respective second ends of the pipes (1) can be individually raised and lowered. The pipes (1) themselves are set up and oriented in space as shown in FIGS. 1 and 2.

In a plurality of successively connected immersion basins the pipes (1) are degreased and subjected to intermediate rinsing. In a further immersion basin (2) set up as shown in FIG. 3 the pipes (1) which have been pre-treated as described and which are supported as described are acted upon in their interior with a coating, for which purpose the immersion basin (2) is filled with a coating liquid (3) over a filling level (h) with (h)>(L)·sin(α) and (h)>(L)·sin (β). In that case the coating liquid (3) is an epoxy/acrylic-based Aquence™ coating material of the 900 series from Henkel in Düsseldorf, Germany. The individual DN nominal widths (n) of the pipes (1), the immersion angles and the removal angles which are identical here (α=β), the repetition frequency over the four method steps (ii.) of first immersion, (iii.) of first removal, (iv.) of second immersion and (v.) of second removal, the conveyor speeds ($v_1=v_2=v_3=v_4$) for immersion and removal, the residence times and the coating thicknesses achieved are to be found in Table 1 hereinafter. The coated pipes (1) are finally rinsed and dried.

The Examples as results of the tests performed confirm the recognitions of the present disclosure in an extremely vivid fashion. Below α, −β=1° the coating on the inside wall (b) of the pipes (1) turns out to be too thin and with flaws and cracks to be noted, the same applies for ranges above α, −β=30°.

Within the claimed angle range of $1°<(\alpha)<30°$ and $-30°<(\beta)\leq-1°$ the coatings are uniform and homogeneous and at least in a range above 12.8 μm with a calculated value of C=125 as the constant for type and condition of the pipe in the Hazen-Williams formula. Within the preferred angle ranges of $1.8°<(\alpha)<5.5°$ and $-5.5°<(\beta)\leq-1.8°$ it is also possible to achieve coating thicknesses of more than 21 μm with a calculated value of C≥130. The coatings are absolutely uniform and homogeneous and free from any flaws, so that water cannot infiltrate under them even after years. Thus the basic problem of providing pipes (1) in general, which are free from corrosion even after a prolonged period of use and which thus permit a monetary improvement in the design and operation of fire protection installations is completely solved.

TABLE 1

| Example | Pipe (1)-DN-Nominal width (n) | Angle ($\alpha = -\beta$) | Repetition frequency over the four method steps (ii.), (iii.), (iv.), (v.) | Conveyor speeds ($v_1 = v_2 = v_3 = v_4$) | Residence time per dip operation in accordance with method steps (ii.) with (iii.) and (iv.) with (v.) | Ø-coating thickness | Comments/assessment |
|---|---|---|---|---|---|---|---|
| 1 | 32 | 0° | 1 | 9 m/min | 90 sec | 8.5 μm | Pipes (1) partly float up during immersion, no continuous and flaw-free coating |
| 2 | 32 | 2.5° | 2 | 9 m/min | 80 sec | 28.0 μm | Excellent uniform coating; C = 140 |
| 3 | 15 | 2.5° | 1 | 9 m/min | 90 sec | 12.8 μm | Uniform coating; C = 125 |
| 4 | 15 | 4.5° | 3 | 9 m/min | 60 sec | 25.5 μm | Excellent uniform coating; C = 140 |
| 5 | 15 | 10° | 2 | 9 m/min | 80 sec | 13.5 μm | Uniform coatinq; C = 125 |
| 6 | 32 | 4.5° | 2 | 9 m/min | 80 sec | 21.5 μm | Excellent uniform coating; C = 130 |
| 7 | 32 | 10° | 4 | 9 m/min | 60 sec | 25.5 μm | Excellent uniform coating; C = 130 |
| 8 | 32 | 20 | 2 | 9 m/min | 80 sec | 15.5 μm | Uniform coating; C = 125 |
| 9 | 32 | 40° | 3 | 9 m/min | 60 sec | 10.0 μm | Cracks and flaws in the coating; C = 105 |
| 10 | 32 | 45° | 2 | 9 m/min | 80 sec | 8.5 μm | Cracks and flaws in the coating; C = 100 |

The invention claimed is:

1. A method of coating a pipe (1) in its interior, wherein the pipe (1) to be coated in its interior has
    an outside (a) and an inside (b),
    a first outer end ($e_1$) at the first end of the pipe (1) and a second outer end ($e_2$) at the second end of the pipe (1),
    a length (L),
    a first inside diameter ($D_1$) at the first outer end of the pipe (1) and a second inside diameter ($D_2$) at the second outer end of the pipe (1), and
    a central axis (M),
    wherein the method according to the disclosure is characterised in that the method has at least the following method steps:
    (i.) providing an immersion basin (2) which
    is filled with a coating liquid (3) up to a filling level (h), the coating liquid containing $FeF_3$ iron fluoride and paint particles in dispersion and
    is suitable for receiving over its full length (L) the pipe (1) to be coated,
        (ii.) first immersion of the pipe (1) to be coated into the coating liquid (3) in a chemical-based process,
        (iii.) first removal of the pipe (1) to be coated from the coating liquid (3) ensuring an angle ($\alpha$) between the central axis (M) and the surface of the coating liquid (3) with $1°<(\alpha)<30°$,
        (iv.) second immersion of the pipe (1) to be coated into the coating liquid (3) in a chemical-based process,
        (v.) second removal of the pipe (1) to be coated from the coating liquid (3) ensuring an angle ($\beta$) between the central axis (M) and the surface of the coating liquid (3) with $-30°<(\beta)<-1°$, and
        (vi.) ensuring a filling level of the coating liquid (3) in the immersion basin (2) with $(h)>(L)\cdot\sin(\alpha)$ and $(h)>(L)\cdot\sin(\beta)$.

2. A method of coating a pipe (1) in its interior according to claim 1, wherein a plurality of pipes (1) are simultaneously subjected to method steps (ii.) to (vi.).

3. A method of coating a pipe (1) in its interior according to claim 1, wherein the four method steps (ii.) first immersion, (iii.) first removal, (iv.) second immersion and (v.) second removal are repeated with a repetition frequency of between 1 and 7.

4. A method of coating a pipe (1) in its interior according to claim 1, wherein the four method steps (ii.) first immersion, (iii.) first removal, (iv.) second immersion and (v.) second removal are repeated with a repetition frequency of between 1 and 3.

5. A method of coating a pipe (1) in its interior according to claim 1, wherein the angle ($\alpha$) is within the range of 1.8° and 5.5°.

6. A method of coating a pipe (1) in its interior according to claim 1, wherein the angle ($\alpha$) is within the range of 1.8° and 3.5°.

7. A method of coating a pipe (1) in its interior according to claim 1, wherein the angle ($\beta$) is within the range of −1.8° and −5.5°.

8. A method of coating a pipe (1) in its interior according to claim 1, wherein the angle ($\beta$) is within the range of −1.8° and −3.5°.

9. A method of coating a pipe (1) in its interior according to claim 1, wherein the angles ($\alpha$) and ($\beta$) within the four method steps (ii.) first immersion, (iii.) first removal, (iv.) second immersion and (v.) second removal are identical.

10. A method of coating a pipe (1) in its interior according to claim 1, wherein the first inside diameter ($D_1$) at the first end of the pipe (1) and the second inside diameter ($D_2$) at the second end of the pipe (1) are identical.

11. A method of coating a pipe (1) in its interior according to claim 1, wherein the coating liquid (3) is kept in motion in the immersion basin (2) by means of a circulating device (6).

12. A method of coating a pipe (1) in its interior according to claim 1, wherein
the immersion speed ($v_1$) for first immersion,
the speed ($v_2$) for the first removal,
the immersion speed ($v_3$) for the second immersion, and
the speed ($v_4$) for the second removal
are respectively in a range of 6 to 12 m/min.

13. A method of coating a pipe (1) in its interior according to claim 12, wherein the filling level (h) is so selected to ensure internal wetting over the entire periphery with the coating liquid (3) over the entire pipe length (L) of the pipe (1) to be coated during an entire immersion and removal cycle (ii., iii., /// iv., v.) having regard to the speeds ($v_1$, $v_2$, $v_3$, $v_4$) over a period of 60 sec to 210 sec.

14. A method of coating a pipe (1) in its interior according to claim 12, wherein the filling level (h) is so selected to ensure internal wetting over the entire periphery with the coating liquid (3) over the entire pipe length (L) of the pipe (1) to be coated during an entire immersion and removal cycle (ii., iii., /// iv., v.) having regard to the speeds ($v_1$, $v_2$, $v_3$, $v_4$) over a period of 85 sec to 105 sec.

15. A method of coating a pipe (1) in its interior according to claim 1, wherein the pipe (1) is of a nominal width (n) in a range of DN 32 to DN 65.

16. A method of coating a pipe (1) in its interior according to claim 1, wherein the pipe (1) is in the form of a mild steel metal pipe of a length (L) in a range of 7 m to 12 m.

\* \* \* \* \*

UNITED STATES PATENT AND TRADEMARK OFFICE
CERTIFICATE OF CORRECTION

PATENT NO.         : 9,211,427 B2
APPLICATION NO.    : 14/376323
DATED              : December 15, 2015
INVENTOR(S)        : Andreas Roenpagel et al.

Page 1 of 1

It is certified that error appears in the above-identified patent and that said Letters Patent is hereby corrected as shown below:

At column 3, line 44, insert --µm,-- after "28".

Signed and Sealed this
Twenty-sixth Day of April, 2016

Michelle K. Lee
*Director of the United States Patent and Trademark Office*